United States Patent
Quero Reboul

(10) Patent No.: US 8,525,976 B2
(45) Date of Patent: Sep. 3, 2013

(54) METHOD FOR POSITIONING A SURFACE IN RELATION TO A LIGHT SOURCE USING SENSORS

(75) Inventor: José Manuel Quero Reboul, Sevilla (ES)

(73) Assignee: Universidad de Sevilla, Sevilla (ES)

( * ) Notice: Subject to any disclaimer, the term of this patent is extended or adjusted under 35 U.S.C. 154(b) by 148 days.

(21) Appl. No.: 13/146,116

(22) PCT Filed: Jan. 25, 2010

(86) PCT No.: PCT/ES2010/000024
§ 371 (c)(1),
(2), (4) Date: Oct. 5, 2011

(87) PCT Pub. No.: WO2010/084224
PCT Pub. Date: Jul. 29, 2010

(65) Prior Publication Data
US 2012/0050725 A1 Mar. 1, 2012

(30) Foreign Application Priority Data
Jan. 26, 2009 (ES) .................................. 200900206

(51) Int. Cl.
*G01C 3/08* (2006.01)
(52) U.S. Cl.
USPC .......... 356/4.01; 356/3.01; 356/4.1; 356/5.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 3,986,021 A | 10/1976 | Hitchcock |
| 4,013,885 A | 3/1977 | Blitz |
| 4,211,922 A * | 7/1980 | Vaerewyck et al. ........ 250/203.4 |
| 2006/0042624 A1 | 3/2006 | Zhang |
| 2008/0236568 A1* | 10/2008 | Hickerson et al. ............ 126/578 |

FOREIGN PATENT DOCUMENTS

EP      1 475 582 A2    11/2004

* cited by examiner

*Primary Examiner* — Luke Ratcliffe
(74) *Attorney, Agent, or Firm* — Arent Fox LLP

(57) ABSTRACT

The invention relates to a method for positioning a surface in relation to a light source using sensors. The method can be used to control the position of a reflective surface (2) such that the reflected light (7) originating from a light source (1) falls on an objective point (8), through the use of a first sensor (4) which determines the position of the light source (1) in relation to a reference direction (9) and a second sensor (4) which is solidly connected to the reflective surface (2) and which determines the relative position of the reflective surface (2) in relation to the light source (1). Having ascertained these positions and the relative position of the reflective surface (2) in relation to the objective point (8), the method is used to determine the necessary movement to be applied to the reflective surface (2) so that the reflected light (7) falls on the objective point (8). The invention is intended to be used to reflect sunlight on a remote collector in order to illuminate buildings and, in general, for any use requiring reflected light to be directed to an objective point (8).

12 Claims, 4 Drawing Sheets

METHOD FOR POSITIONING A SURFACE IN RELATION TO A LIGHT SOURCE USING SENSORS

OBJECT OF THE INVENTION

The invention relates to a method for positioning a reflective surface, mounted on a positioning device, in relation to a light source using sensors.

The invention calculates the error existing between the current position of the axis perpendicular to the reflective surface and the theoretical position that must have in order to the reflected light falls on a defined point, called objective point. This error is measured both in azimuth and elevation, and the procedure being applied on both axes separately. For this purpose it is employed a first fixed sensor that measures the position of the light source with respect to a reference direction, and a second sensor solidly connected to the surface providing the incidence angle of the light from the light source in relation to the perpendicular to the surface. On the other hand, it is known the relative position of the objective point whereto it is wanted to direct the reflected light and the relative position of the rotation center of the reflective surface and the reference direction; so that by a geometrical calculation it is achieved the error and the action to position correctly the reflective surface.

In general, the invention is applicable to perform the positioning of a reflective surface in relation to a light source, and more specifically to perform such positioning in relation to the sun, so that the invention has direct application in the case of heliostats, reflective elements and solar collectors in the power generation solar systems, and it is also useful for indirect lighting systems employing the light reflected by the sun.

STATE OF THE ART

Currently, the problem of positioning a reflective surface is booming because their use is essential in concentrating solar plants, employing mirrors, called heliostats, which reflect the sunlight on a remote collector even hundreds of meters. The position where the reflected light must affect it must be specified with an error of the order of decimeter. For this reason, the accuracy with which the mirror must be positioned in relation to the sun must be very high. The heliostats employed in these plants make use of a positioning system based on a two axis positioner, powered by two motors with a high degree of reduction. An angle encoder-type angle sensor determines the angle rotated for each axis in relation to a starting position. It is also known the position of the sun from a set of equations, called solar almanac, which should be evaluated with a periodicity of less than 20 seconds. The position of the concentrator, sun and the relative of the heliostat being known, the committed error and the consequent control action on the motors can be calculated.

The starting position is determined by a sensor that like the angle sensor must be highly accurate to meet the above-mentioned aim requirements. Also, the structure supporting the mirror and the positioning system must be robust enough to withstand the mirror and the effort exerted by the wind on it, and also being very tight to reduce the tolerances of its action. Finally, the computational burden for calculating the position is high, requiring the use of a high performance microprocessor. For that reason, a system to simplify the structure is required, the sensors and calculation in order to reduce the manufacturing costs of the heliostat.

In the Spanish patent with application number P-200800999 is taught the use of a sensor that determines the incidence angle of light with high precision. The sensor is initially positioned so that the reflected light on the surface falls on it at an angle of 0° in azimuth and elevation when the light falls on the objective focus. In this way the control loop is closed, feeding back the committed error directly from the reflected light, enabling to reduce the manufacturing costs, since it eliminates the use of angle, and starting position sensors, and the mechanical errors generated by the structure and external disturbances such as the wind, are also compensated. But the use of this sensor in the reflected light has the disadvantage of an expensive installation, because it requires an auxiliary structure that supports it in front of the mirror, making this solution nonviable for large-area heliostats.

By the invention it is enabled to control the position of the mirror with the help of two sensors. One determines the position of the sun in relation to a reference surface and other solidly connected to the mirror, which determines the position relative of the same in relation to the sun. By computing these angles and knowing the relative position of the heliostat in relation to the concentrator, it can be determined the movement necessary to reflect light in the adequate point. This solution avoids having to employ auxiliary structures in front of the heliostats to support the sensors, making easier its use, reducing the installation and maintenance costs. The inclusion of a microprocessor circuit allows independent assembly of the heliostats, since all control is carried out locally.

DESCRIPTION OF THE INVENTION

To achieve the objectives and solve the drawbacks listed above, the invention has developed a new method for positioning a surface in relation to a light source using sensors, that allows to position a reflective surface in relation to a light source in order to the reflected light by the reflective surface falls on an objective point of known position, by the action of an electromechanical device with two rotation axes, in azimuth and elevation.

The method of the invention is characterized in that first comprises making the beam reflected by the reflective surface falls on the objective point, to then measure, by a first sensor located at a fixed position, a first azimuth angle and a first elevation angle which forms the beam of light incident on the first sensor in relation to a reference direction, to then determine a second azimuth angle and a second elevation angle, both invariable and known, which forms the reflected beam on the reflective surface and which falls on the objective point in relation to the reference direction.

Next, the procedure of the invention comprises the geometry calculation of a third azimuth angle and a third elevation angle. The third azimuth angle is calculated from the first and second azimuth angle, and also the third elevation angle is calculated from the first and second elevation angle. The third azimuth and elevation angles correspond to the angles which form the incident beam in relation to the axis perpendicular to a second sensor solidly connected to the reflective surface, in azimuth and elevation respectively, so that the third azimuth and elevation angle can be measured by the second sensor.

Furthermore, the process of the invention comprises a stage in which any position of the reflective surface is measured, by the second sensor, a fourth azimuth angle and a fourth elevation angle which forms the reflected beam with the axis perpendicular to the second sensor. Next, the third azimuth angle is compared with the fourth azimuth angle so that in the case there is coincidence between the third and fourth azimuth angle is maintained the position in azimuth of the reflecting surface, and otherwise the position of the reflective surface was varied to make coincide the third and fourth azimuth angle. Likewise, the third elevation angle is compared with the fourth elevation angle calculated so that in the case in which there is coincidence between the third elevation angle and the fourth elevation angle, it is maintained the position in elevation of the reflective surface, and otherwise it was varied the position in elevation of the reflective surface to make coincide the third and fourth elevation angle. Accordingly the method of the invention is applied independently and simultaneously in azimuth and elevation to achieve the correct positioning of the reflective surface so that the reflected light falls on the objective point.

In the preferred embodiment of the invention the light source is the sunlight, but it can also be any light source.

To ensure the phases that were previously described, the method of the invention includes storing the first, second and third azimuth and elevation angle to be able to make the different calculations.

The invention provides that the sensors are angle encoder-type solar angle sensor with a high precision to perform the correct positioning of the reflective surface so that the reflected light falls on the objective point.

In one embodiment of the invention, the reference direction is a direction perpendicular to the axis of the first sensor.

The electromechanical device governing the position of the reflective surface is provided with a control circuit which governs the position of positioning means of the reflective surface according to the phases described above.

Furthermore, the positioning means of the reflective surface can be electric motors, hydraulic actuators or pneumatic actuators.

With respect to the reflective surface, this may have a plane, parabolic, cylinder-parabolic or geometry.

The method of the invention has been described for azimuth and elevation axes, but obviously they could be any axes with the same relation that said azimuth and elevation axes.

The invention is applied to concentrating solar plants that employ mirrors, called heliostats, which reflect the sunlight on a remote collector, but it can also be applied to the illumination of buildings for which the reflective surface, for example, is mounted on the top floor of a building, light of which is reflected through holes in its structure.

The invention can be applied for positioning multiple reflective surfaces so that the reflected light falls on the same objective point, achieving greater energy efficiency.

Next, in order to facilitate a better understanding of this specification and forming an integral part thereof, a series of figures are accompanied, in which with an illustrative and not limitative character has been represented the object of the invention.

DESCRIPTION OF THE PREFERRED EMBODIMENT

Figure 1:
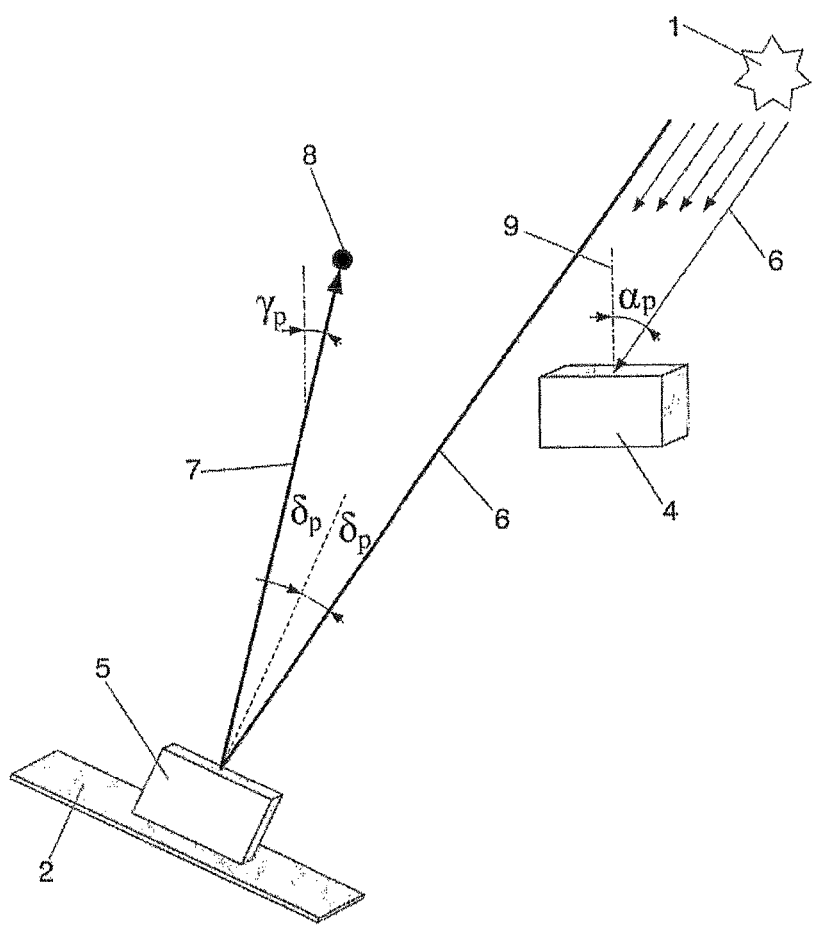
FIG. 1. It shows a plan representation of the method of the invention for positioning a reflective surface in relation to the sun employing two sensors for determining the incidence angle in azimuth. In this case, the reflective surface is properly positioned to direct the reflected light to objective point in azimuth.

The following is a description of the invention based on the above-mentioned figures.

The method of the invention allows positioning of the sun in relation to the sun 1 a reflective surface 2 mounted on an electromechanical device 3 with rotation axes in azimuth (vertical to the floor) and elevation (parallel to the floor) employing a first sensor 4 and a second sensor 5 so that the light 6 incident on the reflective surface 6 provides a reflected light 7 falling on an objective point 8.

The first sensor 4 and second sensor 5 measure the angles that form the projections of the vector of incident light 6 in relation to two orthogonal planes.

Figure 2:
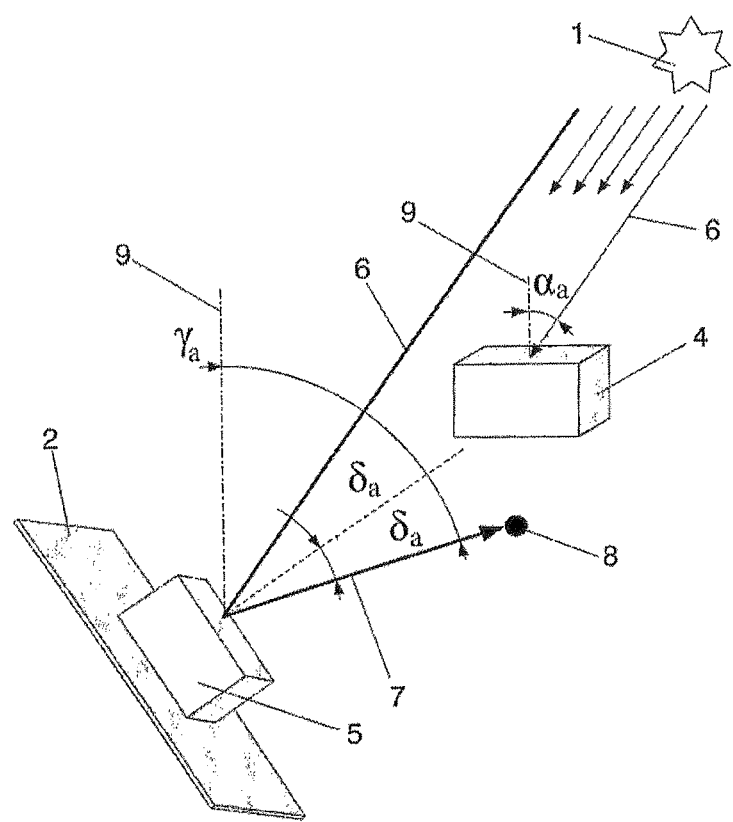
FIG. 2. It represents an elevation view of the method for positioning a reflective surface in relation to the sun employing two sensors for determining the incidence angle in elevation. In this case the reflective surface is properly positioned to direct the reflected light to the objective point in elevation.

In FIGS. 1 and 2, the reflective surface 2 is positioned so that the reflected light falls on the objective point.

In the case of FIG. 1, it is shown a plan view for its application in azimuth. In this case, the first sensor 4 is positioned perpendicular to a reference direction 9, so that though the first sensor 4 is measured a first azimuth angle $\alpha_p$ corresponding to the angle that forms the incident light 6 in relation to the reference direction 9.

Regarding to the second sensor 5, this is located solidly connected to the reflective surface 2, which it is wanted to be positioned so that the reflected light 7 falls on the objective point 8. The objective point 8 forms a second azimuth angle $\gamma_p$ known in relation to the reference direction 9 and its position relative to the rotation center of the surface 2. By analyzing the geometry of FIG. 1 is achieved a third azimuth $\delta_p$ which must be $$\delta_p = \frac{\alpha_p - \gamma_p}{2};$$

also this second angle can be measured by the second sensor 5.

The application of the method in elevation is shown in FIG. 2 and the reasoning is equivalent to that described for FIG. 1.

In the case of FIG. 2 it is shown an elevation view, so that the first sensor 4 measures a first elevation angle $\alpha_a$ corresponding to the angle that forms incident light 6 in relation to the reference direction 9. Usually the first elevation angle $\alpha_a$ is different from the first azimuth angle $\alpha_p$, since the reference direction 9 in its plan and elevation view is composed of two projections that are different for the positioning in azimuth and elevation.

Equivalently, the objective point 8 forms a third elevation angle $\gamma_a$ in relation to the reference direction 9 and its relative position in relation to the rotation center of the reflective surface 2. In this case, by analyzing the geometry is obtained a third elevation angle $\delta_a$ measured by the sensor 5 which by geometry must be $$\delta_a = \frac{\alpha_a - \gamma_a}{2};$$

this second angle may also be measured by second sensor 5.

Accordingly, the invention provides the geometry calculation of the third azimuth angle $\delta_p$ and the third elevation angle $\delta_a$ from the equations discussed, and it may also be measured by the second sensor 5.

Figure 3:
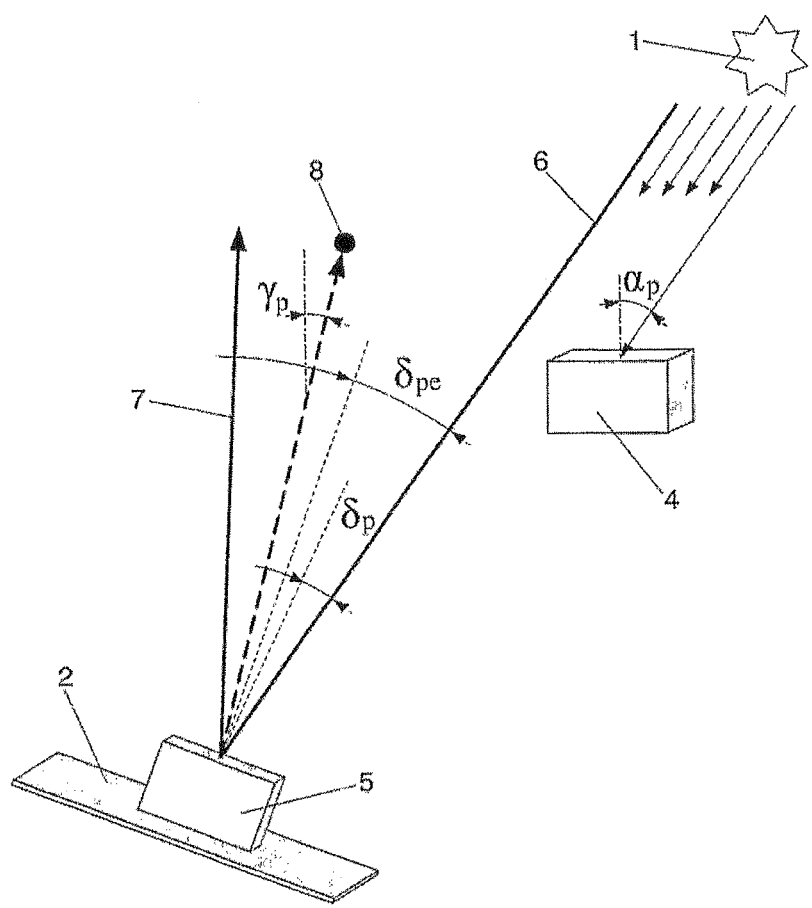
FIG. 3. It represents a plan view of the method of the invention, equivalent to FIG. 1, but in this case the reflective surface is positioned with an error in relation to the objective point, allowing to explain how the correction is made.

In the FIG. 3 is shown the case in which the reflected light 7 does not fall on the objective point 8. In this case through the second sensor 5 is measured a fourth azimuth angle $\delta_{pe}$ and a fourth elevation angle $\delta_{ae}$ that forms the reflected light 7 with the axis perpendicular to the second sensor 5.

Next, the third azimuth angle $\delta_p$ is compared with the fourth azimuth angle $\delta_{pe}$, so that in the case in which there is coincidence between both, the position of the reflective surface 2 is not varied, and otherwise the position of the same is varied to make coincide the third azimuth angle $\delta_p$ and the fourth azimuth angle $\delta_{pe}$. This same operation is performed in the case of elevation.

Figure 4:
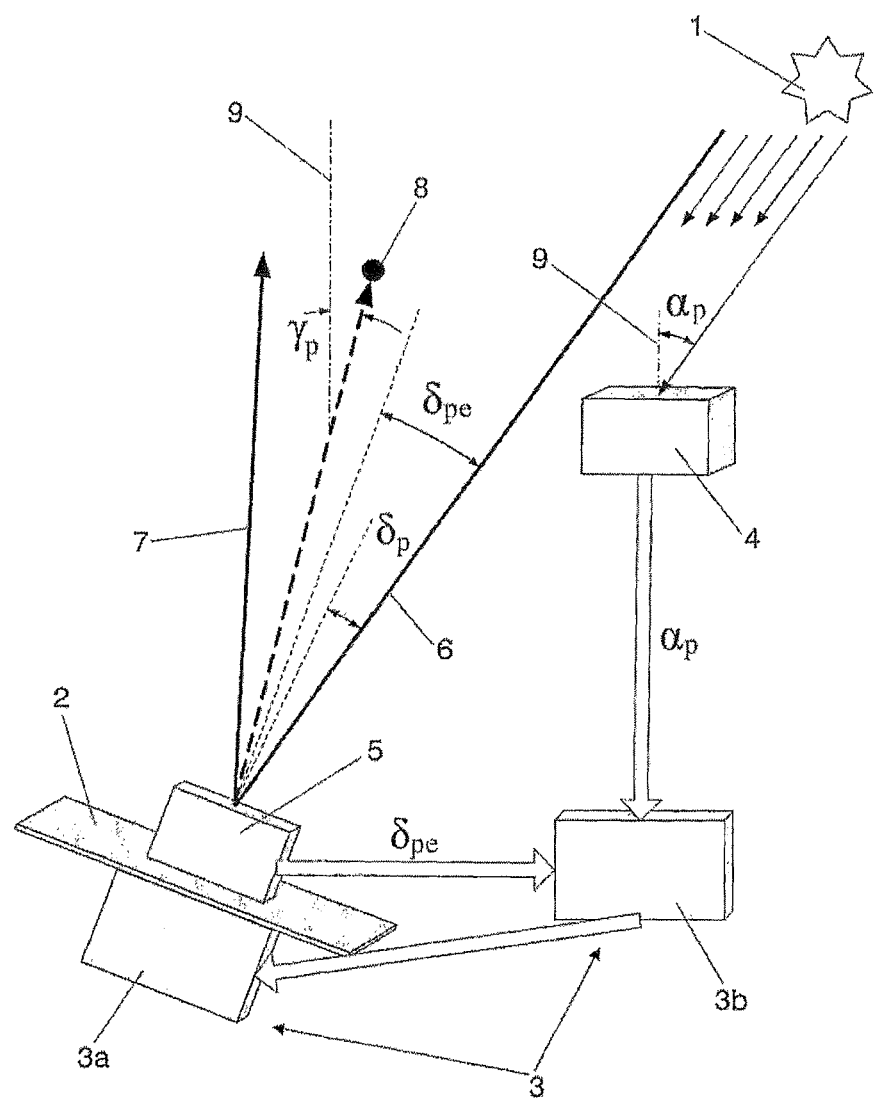
FIG. 4. It shows a plan representation equivalent to the previous figure with the electromechanical device by which the reflective surface is positioned in the correct position so that the reflected light falls on the objective point.

In the FIG. 4 is shown the electromechanical device 3 which allows perform the correct positioning of the reflective surface 2 for its application in azimuth corresponding to that depicted in FIG. 3. In this case the electromechanical device 3 comprises a swing motor in azimuth 3*a* and a control circuit 3*b* for governing the position of the reflective surface 2 so that the third azimuth angle $\delta_p$ and the fourth azimuth angle $\delta_{pe}$ are made coincide.

The control circuit 3*b* is made by a microprocessor that takes the first azimuth angle $\alpha_p$ and the fourth azimuth angle $\delta_{pe}$ provided by the first sensor 4 and the second sensor 5. In turn, it calculates the third azimuth angle $\delta_p$, with which the sunlight should fall on the second sensor 5, and achieves an error of position $$\Delta\delta = \delta_{pe} - \delta_p = \delta_{pe} = \frac{\alpha_a - \gamma_a}{2};$$

so that the microprocessor gives commands to rotate the motor 3*a* in relation to the azimuth axis to cause that the error is 0.

Simultaneously, the same procedure is applied in relation to the vertical axis of elevation.

Thus, by the method of the invention is achieved positioning with precision the reflective surface 2 so that the reflected light 7 falls on the objective point 8.

The invention claimed is:

1. METHOD FOR POSITIONING A SURFACE IN RELATION TO A LIGHT SOURCE USING SENSORS, which allows the positioning of a reflective surface (2) in relation to the light source (1) so that the reflected light (7) by the reflective surface (2) falls on an objective point (8) of known position, by action of an electromechanical device (3) with two axes of rotation in azimuth and elevation; it is characterized in that comprises:
    making that the reflected light (7) by the reflective surface (2) falls on the objective point (8);
    measuring by a first sensor (4) located in a fixed position, a first azimuth angle ($\alpha_p$) and a first elevation angle ($\alpha_a$) forming the beam of light incident on the first sensor (4) with respect to a reference direction (9), and determining a second azimuth angle ($\gamma_p$) and a second elevation angle ($\gamma_a$), both invariable and known, forming the reflected beam (7) on the reflective surface (2) and falling on the objective point (8), in relation to the reference direction (9);
    geometry calculation of a third azimuth angle ($\delta_p$) from the first azimuth angle ($\alpha_p$) and the second azimuth angle ($\gamma_p$) and geometry calculation of a third elevation angle ($\gamma_a$) from the first elevation angle ($\alpha_a$) and second elevation angle ($\gamma_a$), corresponding the third azimuth ($\delta_p$) and elevation ($\delta_a$) angles to the angles which form the incident beam (6) in relation to the axis perpendicular to a second sensor (5) solidly connected to the reflective surface (2), in azimuth and elevation respectively;
    at any position of the reflective surface (2), measuring by the second sensor (5), a fourth azimuth angle ($\delta_{pe}$) and a fourth elevation angle ($\delta_{ae}$) which forms the reflected beam (7) with the axis perpendicular to the second sensor;
    comparing the third azimuth angle ($\delta_p$) with the fourth azimuth angle so that in the case in which there is coincidence between the third azimuth angle ($\delta_p$) and the fourth azimuth angle ($\delta_{pe}$), maintaining the position in azimuth of the reflective surface (2), and otherwise varying the position of the reflective surface (2) to make coincide the third azimuth angle ($\delta_p$) and the fourth azimuth angle ($\delta_{pe}$); and comparing the third elevation angle ($\delta_a$) with the fourth elevation angle ($\delta_{ae}$) so that, in the case in which there is coincidence between the third elevation angle ($\delta_a$) and the fourth elevation angle ($\delta_{ae}$), maintaining the position in elevation of the reflective surface (2), and otherwise varying the position of the reflective surface (2) to make coincide the third elevation angle ($\delta_a$) and the fourth elevation angle ($\delta_{ae}$).

2. METHOD FOR POSITIONING A SURFACE IN RELATION TO A LIGHT SOURCE USING SENSORS, according to the claim 1, characterized in that the light source is the sun (1).

3. METHOD FOR POSITIONING A SURFACE IN RELATION TO A LIGHT SOURCE USING SENSORS, according to the claim 2, characterized in that the first sensor (4) and the second sensor (5) are angle encoder-type angle solar sensors of high precision.

4. METHOD FOR POSITIONING A SURFACE IN RELATION TO A LIGHT SOURCE USING SENSORS, according to the claim 1, characterized in that comprises storing the first azimuth angle ($\alpha_p$), the second azimuth angle ($\gamma_p$) and a third azimuth angle ($\delta_p$) as well as the first elevation angle ($\alpha_a$), second elevation angle ($\gamma_a$) and the third elevation angle ($\delta_a$).

5. METHOD FOR POSITIONING A SURFACE IN RELATION TO A LIGHT SOURCE USING SENSORS, according to the claim 1, characterized in that the reference direction (9) is a direction perpendicular to the axis of the first sensor (4).

6. METHOD FOR POSITIONING A SURFACE IN RELATION TO A LIGHT SOURCE USING SENSORS, according to the claim 1, characterized in that the electromechanical device (3) governing the position of the reflective surface (2) comprises a control circuit (3*b*), which governs the position of positioning means of the reflective surface (2).

7. METHOD FOR POSITIONING A SURFACE IN RELATION TO A LIGHT SOURCE USING SENSORS, according to the claim 1, characterized in that the positioning means of the reflective surface (2) are selected from electric motors (3*a*), hydraulic actuators and pneumatic actuators.

8. METHOD FOR POSITIONING A SURFACE IN RELATION TO A LIGHT SOURCE USING SENSORS, according to the claim 1, characterized in that the reflective surface (2) is selected from a surface with plane, parabolic, cylinder-parabolic and hyperbolic geometry.

9. METHOD FOR POSITIONING A SURFACE IN RELATION TO A LIGHT SOURCE USING SENSORS, according to the claim 1, characterized in that the azimuth and elevation axes are any axes with the same relation that said azimuth and elevation axes.

10. METHOD FOR POSITIONING A SURFACE IN RELATION TO A LIGHT SOURCE USING SENSORS, according to the claim 1, characterized in that it is applied to the illumination of buildings.

11. METHOD FOR POSITIONING A SURFACE IN RELATION TO A LIGHT SOURCE USING SENSORS, according to the claim 10, characterized in that the reflective surface (2) is mounted on the top floor of a building, light of which is reflected through holes of its structure.

12. METHOD FOR POSITIONING A SURFACE IN RELATION TO A LIGHT SOURCE USING SENSORS, according to the claim 1, characterized in that it is applied to reflect any light source.

* * * * *